(12) United States Patent
Hilton

(10) Patent No.: US 7,688,341 B2
(45) Date of Patent: Mar. 30, 2010

(54) LASER JET BOW/TILT CORRECTION

(75) Inventor: Richard L. Hilton, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 405 days.

(21) Appl. No.: 11/759,064

(22) Filed: Jun. 6, 2007

(65) Prior Publication Data
US 2008/0303887 A1    Dec. 11, 2008

(51) Int. Cl.
*B41J 2/47* (2006.01)
(52) U.S. Cl. .................................... 347/254
(58) Field of Classification Search ............... 347/116, 347/229, 234, 240, 248, 249, 251–254
See application file for complete search history.

(56) References Cited

U.S. PATENT DOCUMENTS

| | | | | |
|---|---|---|---|---|
| 5,719,680 A * | 2/1998 | Yoshida et al. | ............... | 358/296 |
| 6,215,511 B1 * | 4/2001 | Asako et al. | ................. | 347/234 |
| 6,359,640 B1 | 3/2002 | Ravitz et al. | | |
| 6,486,906 B1 * | 11/2002 | Foster et al. | ................. | 347/234 |
| 6,816,269 B1 * | 11/2004 | Loce et al. | ................... | 358/1.12 |
| 6,819,351 B2 * | 11/2004 | O'Hara et al. | ............... | 347/237 |
| 7,123,282 B2 * | 10/2006 | Fields et al. | ................. | 347/240 |
| 7,375,738 B2 * | 5/2008 | Corbett et al. | ............... | 347/234 |
| 2006/0119895 A1 * | 6/2006 | Takata et al. | ............... | 358/3.26 |

\* cited by examiner

*Primary Examiner*—Hai C Pham

(57) ABSTRACT

A method for printing with a laser printer includes obtaining data representative of the bow and tilt characteristics of the printer. Data representing an image to be printed is loaded and analyzed. A control signal is determined from the image data and modified based on the known bow and tilt characteristics of this printer, such that the printed image is free of bow and tilt.

23 Claims, 9 Drawing Sheets

//<br>
LASER JET BOW/TILT CORRECTION

BACKGROUND

Laser jet printers produce images by retrieving image data, processing the data, and ultimately transferring the image onto a print medium (e.g., paper). Although specific technologies may vary, laser printers in general include the same basic components. For example, laser printers generally include at least one drum assembly, a charging element, a laser scanning unit, a toner chamber, a toner developer roller, a fuser, and at least one cartridge assembly. Essentially, the drum assembly is given an overall negative charge by the charging element. As the drum revolves, the laser assembly emits a laser beam across the surface of the drum to discharge the negative charge on the drum at predefined points. In this way, the laser "draws" the image to be printed as a pattern of electrical charges onto the drum. Once the image is impressed onto the drum, the drum is coated with negatively charged toner, which is generally a fine powder. Color laser printers generally employ four or more "colors" of toner, each with a corresponding drum, to produce images that can comprise a substantially full color gamut. The colors of toner generally used are Cyan, Magenta, Yellow and Black (CMYK). Since the toner has a negative charge, it clings to the discharged points on the drum, but does not cling to the remainder of the negatively charged drum (i.e., the background of the image). With the toner clinging to the pattern impressed portions of the drum, the drum rolls over a positively charged sheet of paper. Because the charge on the paper is stronger than the charge of the image on the drum, the paper pulls the toner powder away from the drum. At this point, the paper is passed through a fuser (e.g., a pair of heated rollers), which melts the toner powder, fusing it with the fibers of the paper.

In general, the quality of an image produced by a laser printer is related to the path or trajectory that the laser beam takes while traveling across the drum. In other words, an image, when processed by the printer, is broken down into a plurality of horizontal line segments, each of which is processed and transferred onto the drum by the laser. Ideally, the path of the laser beam as it impinges on the drum should be a straight, horizontal line running in the "scan direction," which is generally parallel to the center axis of the drum (i.e., the "ideal" beam path). However, due to an inherent initial offset in the physical configuration of the printer components (i.e., the relationship and alignment of components internal to the laser scanning unit and the alignment of the laser scanning unit to the drum assembly), the path of the laser beam along the drum assembly, rather than being straight and parallel to the drum axis, exhibits a certain amount of bow and tilt. Bow generally refers to the degree of arc in the beam path relative to the center axis of the drum, while tilt refers to the "vertical" offset between one end of the beam path and the opposite end of the beam path. Vertical offset refers to offset in the "process direction," which is perpendicular to the center axis of the drum.

Another consideration for color laser printers is the concept of "color plane registration," which is the alignment of each color plane to form a full color image. Each toner color that is used to produce an image is referred to as a "color plane". Because all of the color planes collectively form the overall image, the quality of the image is dependent upon the alignment of each of the color planes relative to one another. An image having misaligned color planes can appear to lack sufficient sharpness and clarity and can appear disjointed. Proper color plane alignment is often complicated when the laser beam path exhibits bow and/or tilt.

One known method for reducing the effects of bow and tilt is to calibrate and align the laser and the drum assemblies at the manufacturing facility according to tight specifications. This approach, however, can be costly and labor intensive, which ultimately adds to the cost of the printer. Accordingly, the embodiments described hereinafter were developed in light of these and other drawbacks associated with laser printer designs.

BRIEF DESCRIPTION OF THE DRAWINGS

The present embodiments will now be described, by way of example, with reference to the accompanying drawings, in which.

DETAILED DESCRIPTION

Introduction

A method for correcting bow and tilt in a write beam path of a laser printer is provided. The method includes determining distortion in the beam path that is caused by the bow and tilt, and developing a series of laser control signals that compensate for the beam path to correct the distortion. The control signals to correct the distortion are determined by identifying "jump locations" along a horizontal scan line of the image and introducing vertical pixel shifts at these locations to create a "virtual corrected" control signal that compensates for bow and tilt in an "actual" distorted beam path. The "virtual corrected" control signal is essentially a mirror image of the "actual" distorted beam path, and thus the resulting printed image is substantially straight and level. In addition, one or more traditional image processing techniques may be performed prior to or after introducing pixel shifts to ensure the clearest, most visually correct final image. The traditional image processing techniques, which will be explained more fully herein, may include splicing, edge detection, half-toning, sharpening, etc.

System Overview

Figure 1:
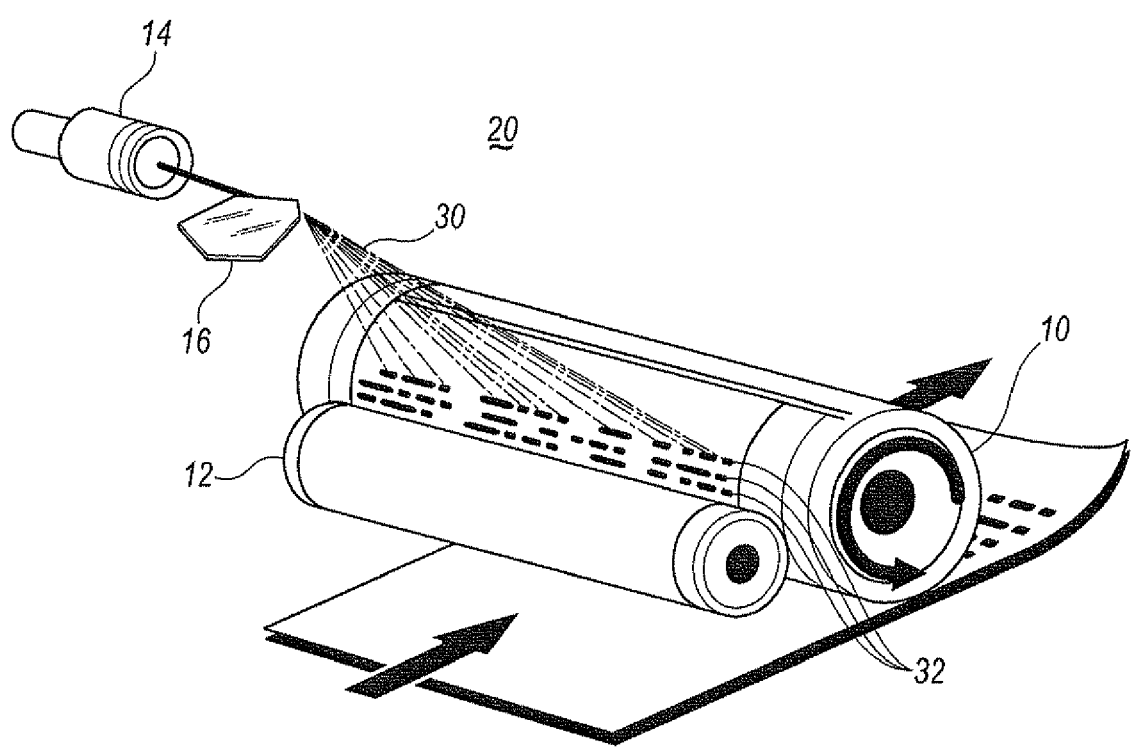
FIG. 1 illustrates a portion of an exemplary laser printer, according to an embodiment
Figure 2:
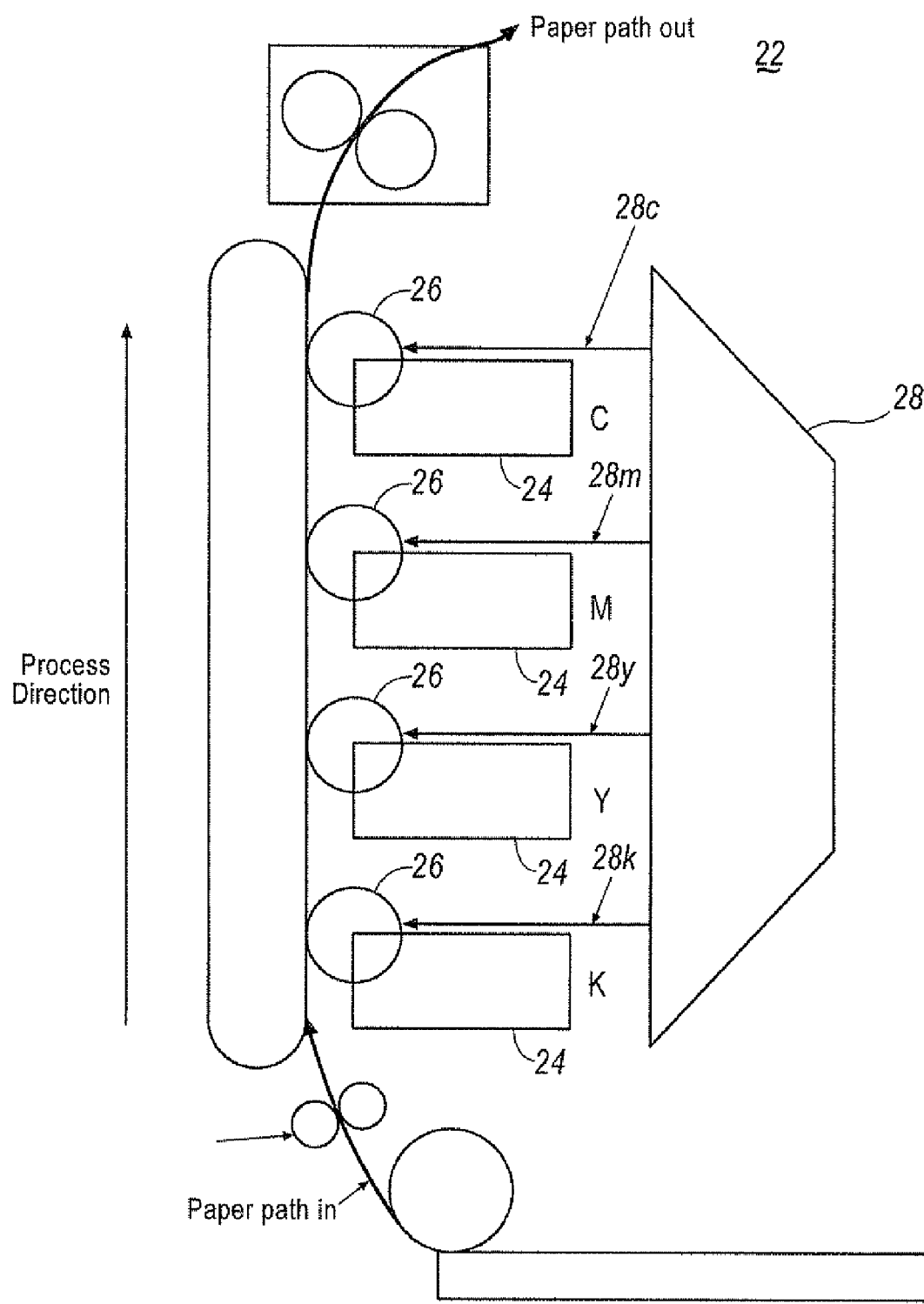
FIG. 2 illustrates a portion of another exemplary laser printer, according to an embodiment.

FIG. 1 illustrates an exemplary portion of a laser printer that includes a drum 10, a toner developer roller 12, a laser assembly 14 and a mirror 16. The laser printer of FIG. 1 illustrates a single printing assembly 20 suitable for a monochrome printer (e.g., a black and white printer), which requires only a black toner cartridge. However, in a color laser printer 22, as shown in FIG. 2, there are four toner cartridges 24 and four drums 26, one for each color Cyan (C), Magenta (M), Yellow (Y), and Black (K) (referred to as a CMYK color scheme). In addition, the color laser printer 22 of FIG. 2 includes a single laser assembly 28 that emits four separate laser beams (28C, 28M, 28Y, and 28K), one for each of the CMYK colors. One of ordinary skill in the art understands that the specific configuration of components in FIGS. 1 and 2 are exemplary. For example, in another embodiment of a laser printer, the toner developer roller 12 is incorporated into a toner cartridge that further includes a toner hopper, stirring rollers and paddles, a doctor blade, a charging element and a waste toner hopper. It will be recognized that other embodiments of the present disclosure are possible, including embodiments incorporating a single-beam, a dual-beam or any multiple-beam system, without parting from the scope of the disclosure.

In general, a laser printer is configured to receive image data from a source, process the image data and ultimately send pulse width modulated (PWM) control signals representing the image to laser assembly 14. The image data often includes continuous tone data, comprising an 8-bit value for each image pixel, which indicates the color and amount of toner used for that pixel. Laser assembly 14 emits a laser beam 30 onto drum 10 through mirror 16. The laser assembly 14 essentially "draws" the image onto the drum 10 as a series of line segments 32, which are ideally parallel to a center axis of the drum 10. However, due to the inherent initial offset in the physical configuration of the printer components (i.e., the relationship and alignment of components internal to the laser assembly 14 and the alignment of the laser assembly 14 and the drum 10), the path of the laser beam 30, rather than being straight and parallel to the drum axis, exhibits a certain amount of bow and tilt. Bow generally refers to the degree of arc in the beam path relative to the center axis of the drum 10, while tilt refers to the vertical offset between one end of the beam path and the opposite end of the beam path.

An image can be thought of as being made up of a grid of pixels, X pixels wide by N rows high. In known laser printers, an image is printed row by row, from row 1 through N. The source data for the image is loaded into memory. The information associated with a certain row of the image is loaded, and a control signal is developed to correspond to this row. Thus, a series of control signals is developed, each corresponding to a horizontal path of individual pixels along the image. The control signal is then sent to the laser, which follows a beam path across the drum printing information associated with the control signal. In order to have the best possible printed image, the laser must follow a path identical to the path of the pixels from which the control signal was developed (i.e., an "ideal" beam path). If the actual beam path onto the drum 10 differs from the "ideal" beam path from which the control signal was developed, the final image will be distorted.

Figure 3:
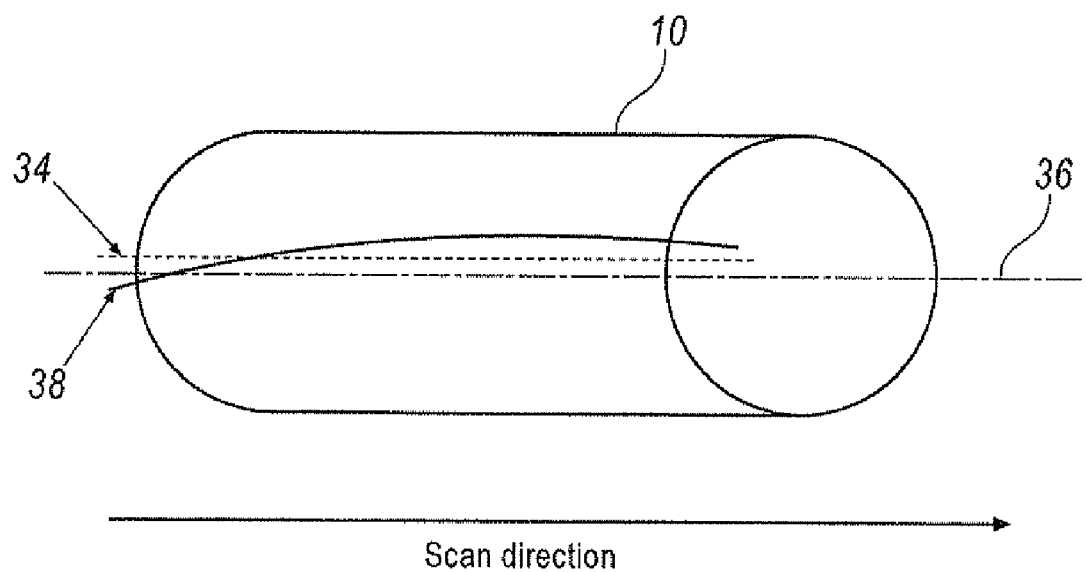
FIG. 3 illustrates the relationship between an "actual" and an "ideal" beam path across a drum, according to an embodiment.
Figure 4:
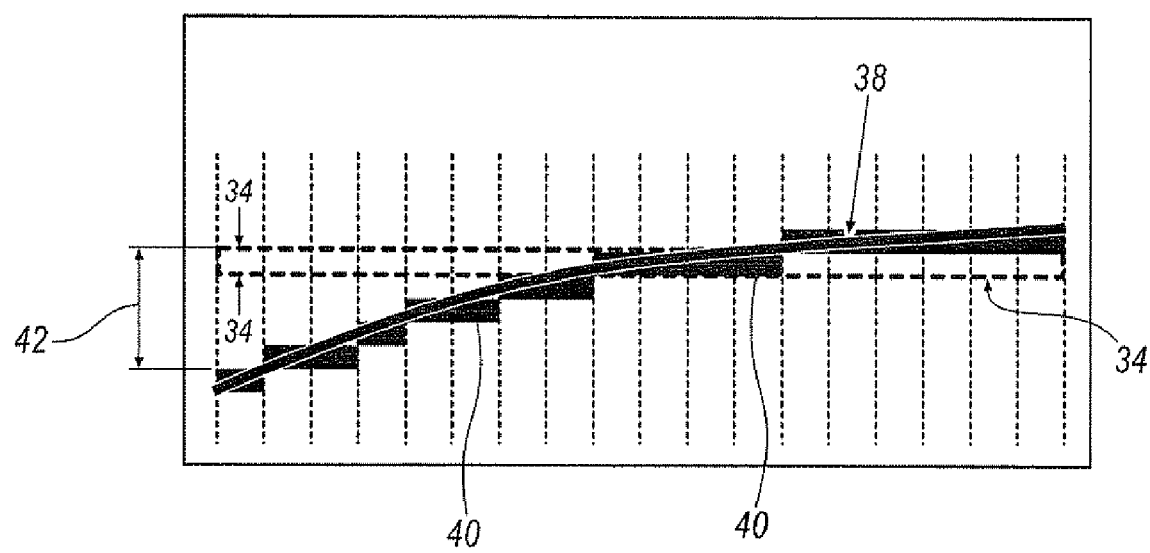
FIG. 4 illustrates an "actual" and an "ideal" beam path across a piece of paper, according to an embodiment.

FIG. 3 illustrates the difference between an "ideal" beam path 34, which is horizontal and parallel to the center axis 36 of the drum 10, and an "actual" beam path 38, which exhibits bow and tilt. From another perspective, FIG. 4 illustrates bow and tilt as it may appear on a printed image. The "ideal" beam path 34 is a horizontal line across the page. Image pixels 40 are the pixels associated with the present pass of the laser along the "actual" beam path 38. The difference between the "ideal" beam path 34 and the "actual" beam path 38 is the offset 42.

Figure 5:
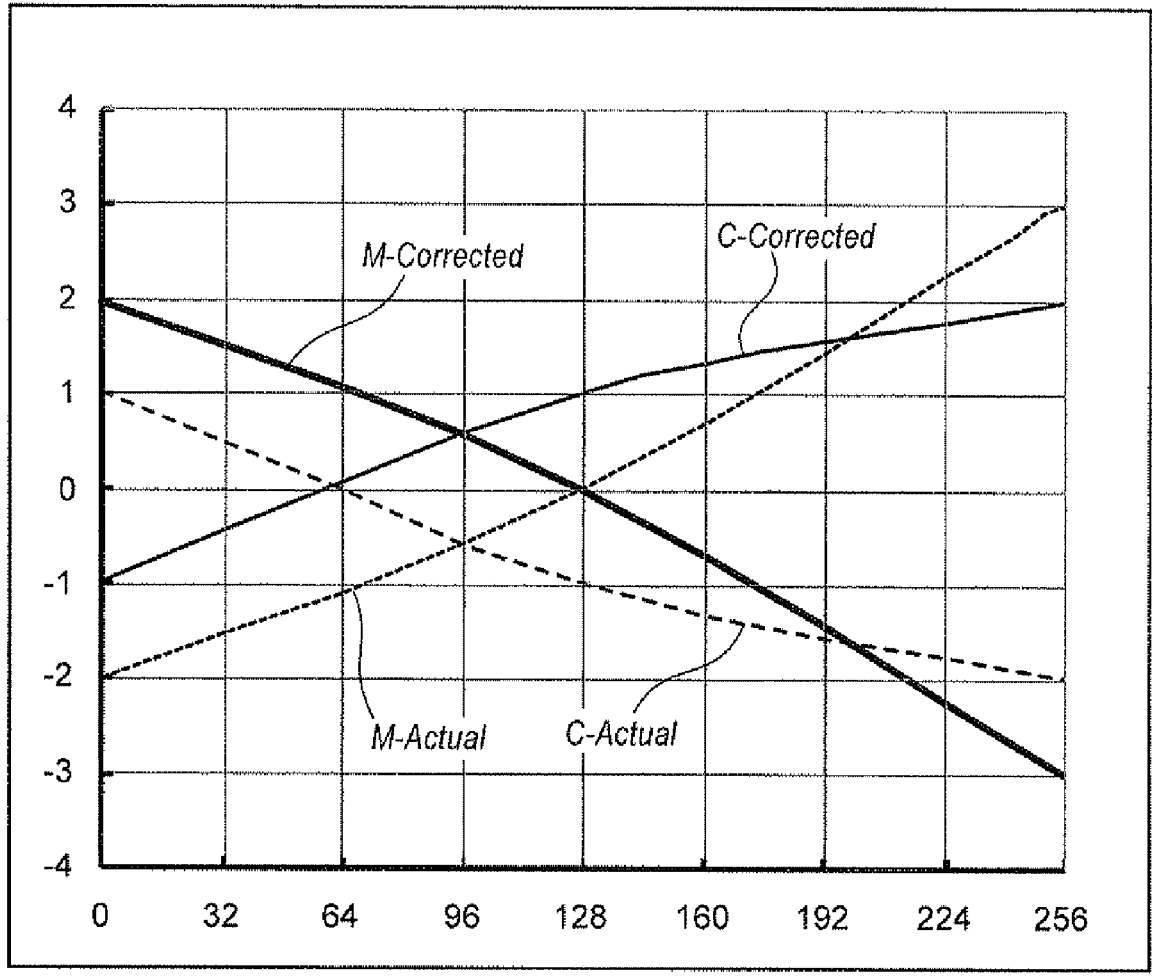
FIG. 5 illustrates the difference between "actual" and "virtual corrected" beam paths, according to an embodiment.

FIG. 5 illustrates a comparison between the "actual" and the "virtual corrected" beam paths for two colors in a particular color laser printer. For illustrative purposes, assume that the two colors are Cyan (C) and Magenta (M). The horizontal axis in FIG. 5 represents the horizontal or scan-direction position of the printed line from the original source image. The vertical axis in FIG. 5 represents the vertical or process-direction position of the printed line from the original source image. The dotted line labeled "C-Actual" represents the actual beam path for Cyan based upon the image data and the known bow and tilt for this particular printer. Similarly, the dotted line labeled "M-Actual" represents the actual beam path for Magenta, which is again based upon the image data and the known bow and tilt for this particular printer. Solid lines "C-Corrected" and "M-Corrected" illustrate the "virtual corrected" Cyan and Magenta beam paths in the "virtual corrected" and spliced image, which is shifted to compensate for the bow and tilt to essentially cancel out the offset.

To perform the correction process, and create the "virtual corrected" beam path of FIG. 5, the calibration data for the bow and tilt must be known or acquired. From the beam calibration data, a series of "jump locations" are determined, which correspond to the points at which the actual beam path moves vertically from one horizontal row to another. It is at these points that the source data from the image may have to be shifted, as shown in FIG. 4. The jump locations can be spaced from each other by any number of pixels, based on the degree of bow and tilt in the beam path. That is, jump locations may be determined based on the laser beam bow and tilt, as well as the locations at which the actual beam moves from one horizontal scan line to another. Jump locations need not necessarily fall on the exact location at which the beam path moves from one row to another. That is, the jump locations may be rounded to the nearest pixel for simplification of the correction process. For instance, jump locations may be rounded to fall on a multiple of a certain number of pixels, such as 16 or 32 pixels. This may introduce some error into the process, though the error may be kept small by keeping the multiple as small as is practical for the given application.

Pre-Processing Techniques

Prior to splicing and shifting, the image data may also undergo a series of pre-processing steps, including edge-detection, sharpening, half-toning and trapping. Pre-processing may be done to improve image quality at certain areas, such as along edges, along thin lines, or in half-tone areas.

Edge Detection

In one embodiment, image processing includes an analysis of the image data to detect edges. Edge detection can be done in any manner known to those of skill in the art, and is generally performed prior to any other processing of the image, such as half-toning, distorting or splicing. Edge detection determines when an edge exists, as well as whether the edge is a light edge or a dark edge, or a step, wherein a pixel is darker than an above pixel and lighter than a below pixel. Edges are detected because they may require additional processing to ensure a smooth printed image. For example, when an image is shifted along an edge, the shift at the jump location could cause a visible discontinuity in the line at the jump location. By locating the edges and identifying discontinuities, image processing methods may be applied to improve the quality of the printed image.

Half-Toning

Figure 9:
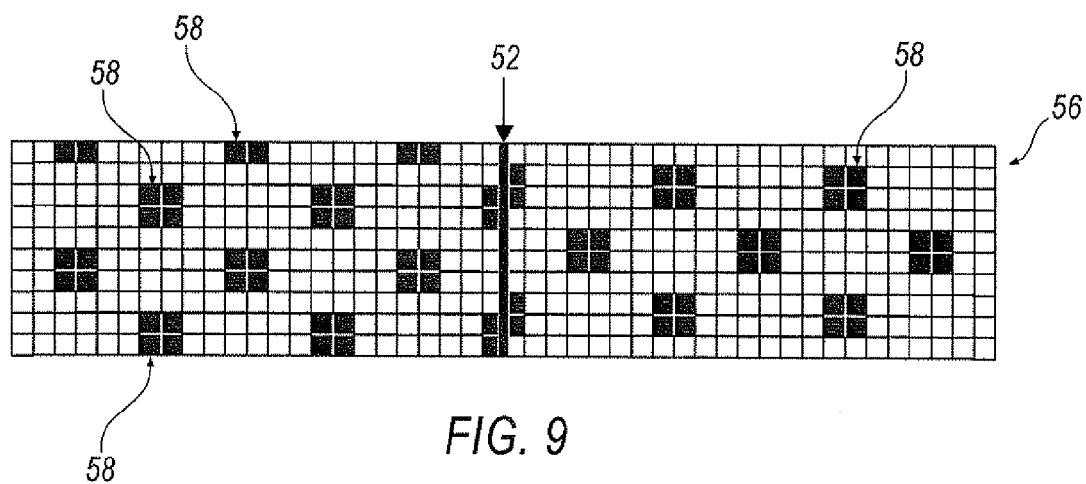
FIG. 9 illustrates an exemplary half-tone dot screen prior to final shifting, showing the offset of the clusters at the jump location.
Figure 10:
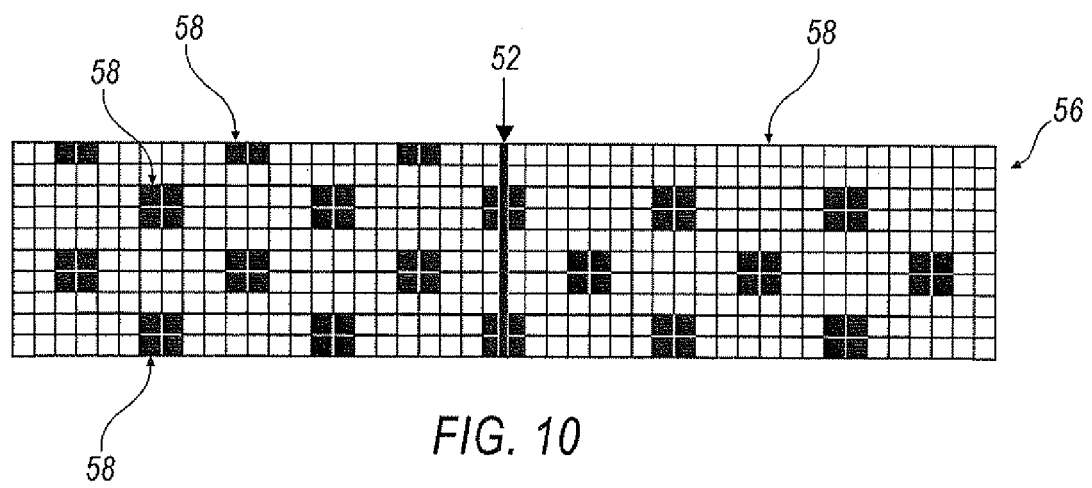
FIG. 10 illustrates the halftone screen of FIG. 9 after shifting.

After edges have been detected, the image generally is half-toned. FIGS. 9 and 10 illustrate a potential half-tone region 56. Half-tone regions often consist of a series of pixel clusters 58 which combine to create a given visual property. For instance, a series of pixel clusters having a certain color, when spaced apart, may create the appearance of a lighter color. Jump locations 52 occurring within the half-tone region could have a visible discontinuity when the image is shifted. Inconsistencies can occur in the size, shape or spacing of clusters 58 straddling the jump location 52, creating a visual discontinuity. To compensate, half-tone regions are detected and the half-tone pattern is shifted at jump locations 52 in a direction that is opposite an induced shift at jump locations 52 during the "pre-distortion" process. Thus, this compensatory shift in the half tone regions essentially counteracts the subsequent pre-processing (i.e., pre-distortion) jump at jump locations 52, ultimately leaving the half-tone regions in their original form. In other words, the half-tone regions may be printed such that they exhibit characteristics from the bow and tilt of the laser. When this is done across an entire half-tone region, the bow and tilt may not be visible, and the final image may actually benefit from a smoother half-tone region.

Control Signal

The half-toning process includes the steps of creating control signals from the image data. Each pixel value, such as an 8-bit value defining the color and amount of toner used for that pixel, is converted to a pulse width modulated signal, indicating a pulse width and a pulse position, which defines a laser control signal for each pixel.

Splicing

Figure 6:
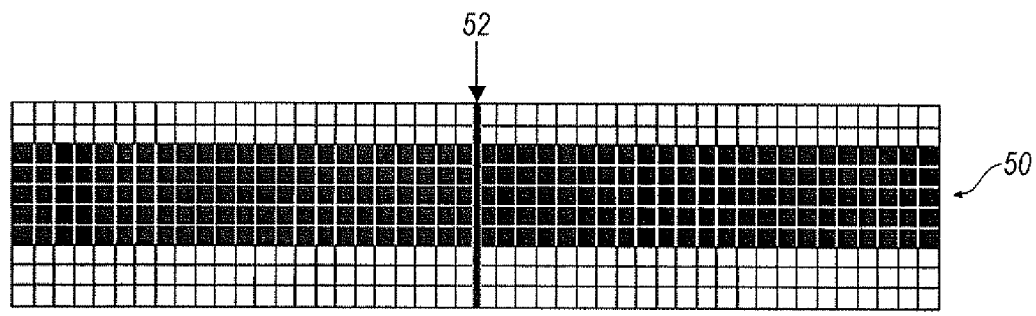
FIG. 6 illustrates an exemplary pixel view of a line prior to splicing or shifting.
Figure 7:
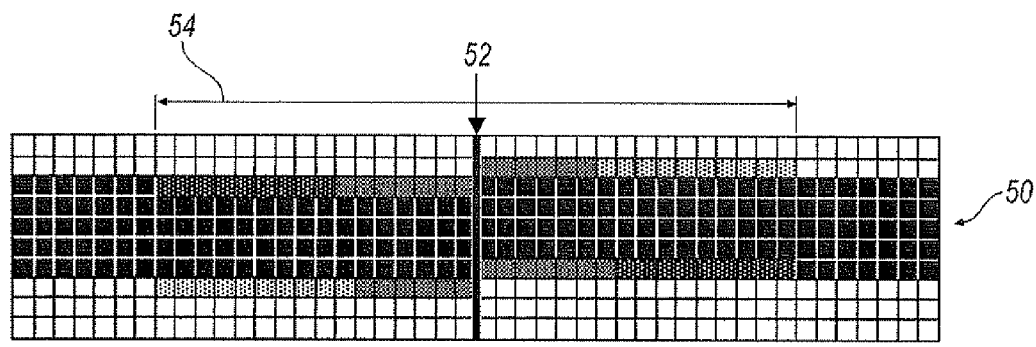
FIG. 7 illustrates an exemplary pixel view of the line of FIG. 6 after splicing but before shifting, according to an embodiment.
Figure 8:
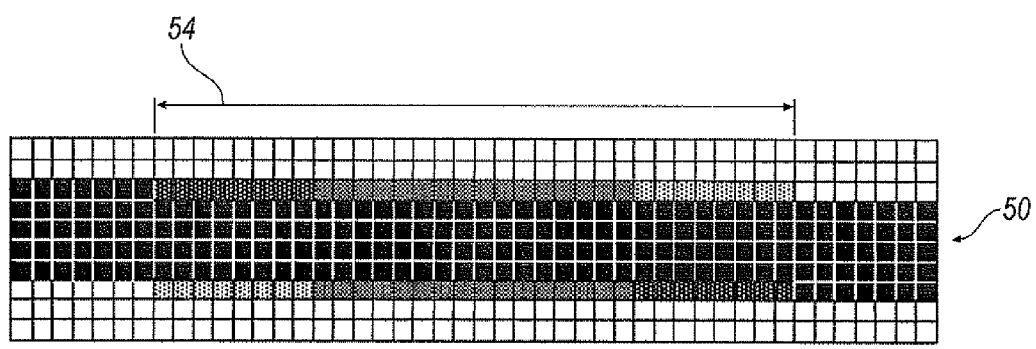
FIG. 8 illustrates an exemplary pixel view of the line of FIG. 7 after shifting, according to an embodiment.

After the edge detection, half-toning and other desired pre-processing techniques have been completed, and initial control signals have been created, splicing is performed. Splicing attempts to smooth out the otherwise sudden and visible shift at jump locations, which is particularly noticeable along edges. Near a jump location, splicing causes appropriate scan lines to fade out or fade in to avoid a sudden change. This is demonstrated in FIGS. 6, 7 and 8. Line 50 has an edge at its top and at its bottom. Without splicing, when pixels are shifted at a jump location 52, there would be a visible discontinuity along the length of the line 50. To perform splicing, a "splice area" is determined. The splice area has a splice length 54 of L pixels, and is centered about the jump location 52. Thus, L/2 pixels are on each side of the jump location 52. FIG. 6 illustrates a line 50 prior to splicing and to shifting. FIG. 7 illustrates the same line 50 after splicing but before shifting. The splicing on line 50 was performed assuming that the pixels of line 50 will be shifted downward to the right of jump location 52, though it is to be understood that in another approach the line 50 could be shifted upward to the right of jump location 52, which may be accomplished by taking the mirror image of the present approach. Along the splice length 54, edge pixels are gradually faded to blend with adjacent pixels, thus allowing a smoother transition at jump location 52. FIG. 8 illustrates line 50 after splicing and after shifting. The smooth transition of line 50 on either side of jump location 52 will ensure a smooth transition in the printed image. The splice length 54 can be any length, though a longer splice length will generally allow for more gradual fading and consequently, a smoother image.

In one embodiment, this fading may be accomplished by determining a weighted average of the "spliced" pixel value with either the pixel above it or the pixel below it. In another embodiment, splicing is performed only at "visible edges".

With visible edge splicing, only certain edges are spliced, as opposed to splicing all edges. This reduces the overall processing time and conserves computing power, and may be preferred where time or computing power is at a premium. In one embodiment, edges are determined and considered "visible" if a pixel value differs from the value of an adjacent pixel, e.g. a pixel above or below a current pixel when detecting horizontal edges, by more than 64.

Although splicing can improve the visual quality of edges along jump points, splicing of half tone regions can have the opposite effect, and actually create visible tone changes. Therefore, in one embodiment, the splicing algorithm may be disabled within the half-tone regions, to prevent the color from washing out due to the continual blending of the colors.

Exemplary Splicing Process

Figure 11:
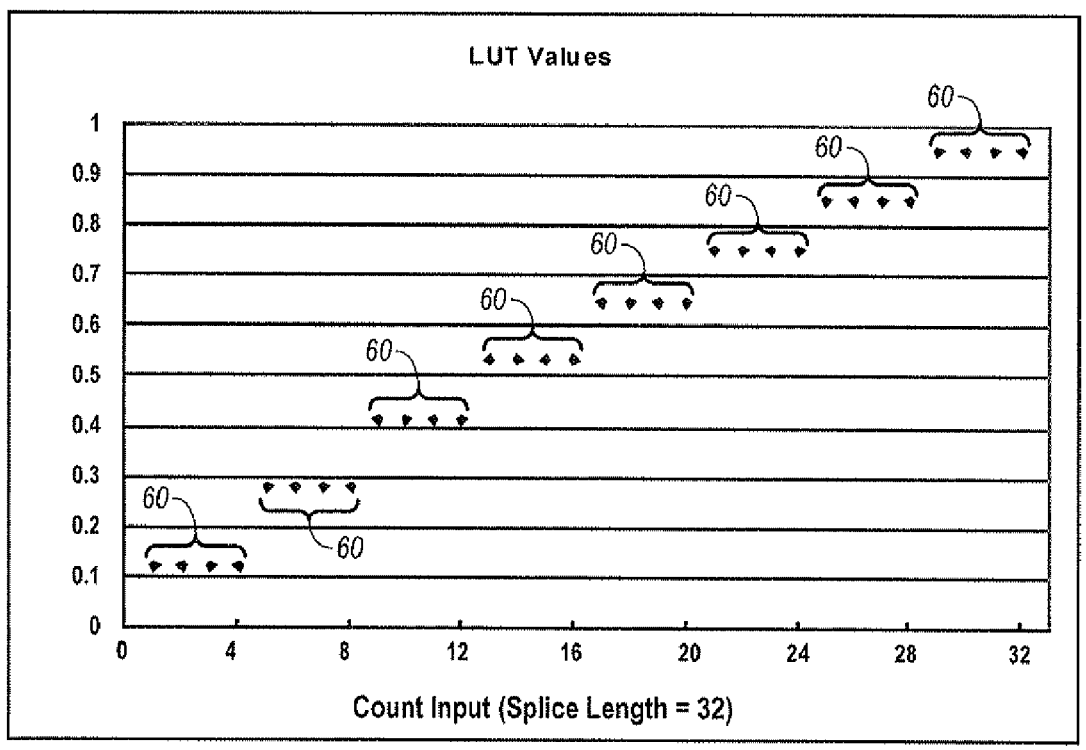
FIG. 11 is an example of a potential look-up table according to an embodiment.

The splicing process will now be described in greater detail according to an embodiment. As stated generally above, splicing takes a control signal representing a line, such as a group of pixels defining an edge, having a given color and, over the course of a splice length, causes the line to fade gradually, from dark to light or vice versa. "Pseudo-code" equations are included below, and are separated into two groups. The first group of equations is used when the current pixel is on a dark edge, situated directly below a pixel on a light edge. The second group of equations is used when the situation is reversed—that is, when the current pixel is on a dark edge situated directly above a pixel on a light edge. The equations address each pixel in turn and edit the "intensity" of the pixel (i.e., the degree of "lightness" or "darkness") to create a smooth fading across the entire splice length. The intensity of the pixel is determined with the aid of a look-up table (LUT), such as that shown in FIG. 11, and is a measure of the pulse width of the control signal at the pixel.

The process assumes that the pixels to the right of the jump location will be shifted down. It is to be understood that the exemplary process is meant to explain just one approach, and is not meant to be limiting. For instance, in another approach, two or more LUT's may be used. For example, one LUT may be used for lines having a thickness of a single pixel, while another LUT may be used for lines having two or more pixels. While the present approach indicates pixels are processed from left to right, it is to be understood that this is for example only, and processing could also proceed from right to left. Further, processing can proceed from left to right or from right to left regardless of whether the laser scan direction proceeds from left to right or from right to left.

Proceeding from left to right, the pixel values and edge indicators are obtained for the current pixel, as well as for the pixels above and below the current pixel. The distance from the current pixel to the next jump location is determined and counter (cnt) is set to the desired splice length (L). The counter remains at this value until the distance from the current pixel to the next jump location is less than L/2. When the distance is less than L/2, the counter value (cnt) is decremented by 1 before each pixel is processed. The counter accesses the look up table (LUT) which indicates weight values 60 to be used in the splicing operation. When dealing with very thin lines (e.g. lines that are one or two pixels thick), splicing regions can have a very different tone than non-splicing regions. Using a LUT is one method to balance out the tone difference. For instance, two half width pulses on adjacent lines do not create as dark a line as a single full width pulse on a single line. Thus, in such an instance, the LUT must produce greater than half width pulses.

The example LUT shown is recognized as being just a single embodiment, and is meant to be demonstrative, but is not meant to be limiting. The LUT shown in FIG. 11 was created using a gamma type function of the form:

$$LUT(cnt) = \left(\frac{floor(cnt/(L+1)*Levels)+0.5}{Levels}\right)^{1/\gamma}$$

In the above function, L represents the splice length 54. The exemplary LUT was chosen to have L equal to 32 pixels, 8 levels, and a gamma of 1.33. The gamma value can be altered to change the shape of the resultant curve. It is to be understood that other variable values and other functions can be chosen, with corresponding changes to the lookup table. The LUT can also be created experimentally and manually entered as a table.

In the exemplary embodiment, different functions are used to process the area along the splice length 54 to the left of the jump location 52 and the area along the splice length 54 to the right of the jump location 52. While processing a pixel in the area along the splice length 54 before a jump (counter is greater than or equal to L/2), when the jump will be in a downward direction, attention is placed on the current pixel and the pixel above it. The processing of the pixel is then performed according to the following logic:

```
If current pixel is a dark edge
  If above pixel is light edge
    Curr_pix = LUT(cnt) * Curr_pix + (1-LUT(cnt)) * Above_pix
  Else
    Curr_pix = (1-LUT(L-cnt)) * Curr_pix + LUT(L-cnt) *
    Above_pix
  End if
Else if current pixel is a light edge AND above pixel is a dark edge
    Curr_pix = (1-LUT(L-cnt)) * Curr_pix + LUT(L-cnt) * Above_pix
Else if current pixel is not an edge AND above pixel is a dark edge
    Curr_pix = LUT(cnt) * Curr_pix + (1-LUT(cnt)) * Above_pix
End if
```

If the current pixel is not modified by the above logic, then there is no change to the current pixel value. When the counter is less than L/2, this indicates that the current pixel is to the right of the jump location. At this point, attention is placed on the current pixel and the one below it. The processing of the pixel is then performed according to the following logic:

```
If current pixel is a dark edge
  If below pixel is light edge
    Curr_pix = LUT(L-cnt) * Curr_pix + (1-LUT(L-cnt)) *
    Below_pix
  Else
    Curr_pix = (1-LUT(cnt)) * Curr_pix + LUT(cnt) * Below_pix
  End if
Else if current pixel is a light edge AND below pixel is a dark edge
    Curr_pix = (1-LUT(cnt)) * Curr_pix + LUT(cnt) * Below_pix
Else if current pixel is not an edge AND below pixel is a dark edge
    Curr_pix = LUT(L-cnt) * Curr_pix + (1-LUT(L-cnt)) * Below_pix
End if
```

Again, if the current pixel is not modified by the above conditions, there is no change to the current pixel value.

When the counter reaches 0, processing for this jump location 52 is complete. The counter is set back to L, the next jump location and direction are loaded and processing continues in the same manner as described above.

The preceding embodiment is useful to smooth the sudden jump at jump locations 52, though it is possible that the jump will still be visible. The visibility of jumps in the line is generally inversely proportional to the splice length 54. Thus, a longer splice length is generally better suited to mask a jump.

Shifting

As the splicing calculations are completed for each pixel, the pixel is loaded into a memory store, such as an output buffer. As each jump location 52 is reached, the line address in the output buffer is shifted in the appropriate direction. Thus the control signal, which is the output buffer for a single sweep of the laser along the beam path, may write pixels found in multiple image lines as shown in FIG. 4. Similarly, a single horizontal line on the original image may be printed in parts, through multiple successive sweeps of the laser.

Exemplary Process

Figure 12:
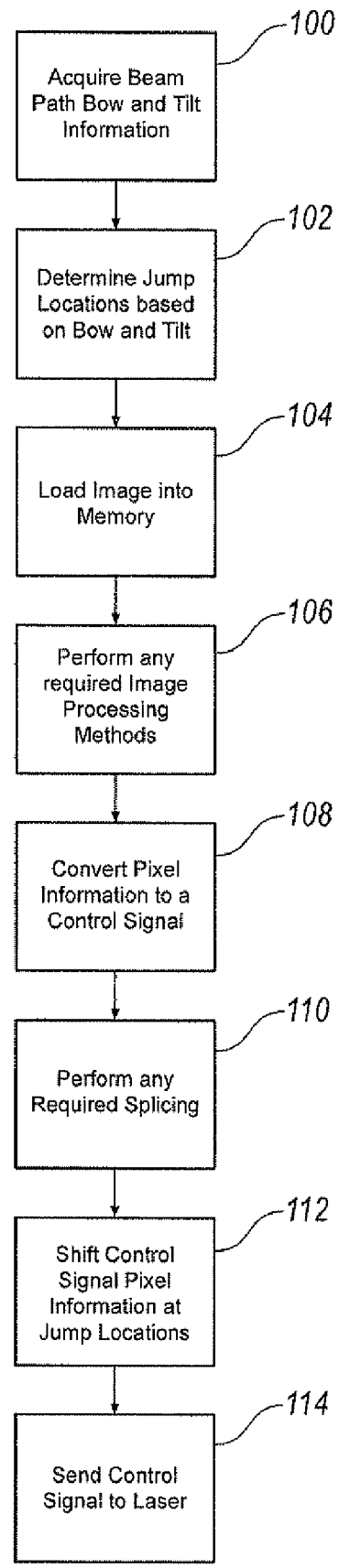
FIG. 12 illustrates a flow chart of an exemplary correction process, according to an embodiment.

FIG. 12 illustrates an exemplary process for generating an image and correcting bow and tilt. First, at step 100 the bow and tilt for a given laser is acquired, e.g. from printer memory. Generally, bow and tilt can be measured during fabrication of the printer and stored in memory, or may be measured periodically during operation by sensors (not shown). At step 102, the jump locations along the laser beam path are determined based on the acquired bow and tilt. At step 104, the image data is loaded into memory. As explained previously, the image data generally consists of 8-bit continuous tone image data. At step 106, the loaded image is analyzed, and any required image processing methods ("pre-processing techniques"), such as edge detection and sharpening, are performed. The analysis of the image and the subsequent image processing methods take the jump locations into account, as edges and half-tone areas can be affected by pixel shifts at the jump locations. Once the image pre-processing methods have been performed on the pixels, the pixel data is converted by half-toning at step 108 to a control signal, which is typically a pulse width modulated (PWM) signal. At step 110 any necessary splicing is performed on the control signal. Splicing is performed to smooth a transition from one line to another, reducing visible discontinuities in edges at jump locations, where vertical pixel shifts can cause a visual discontinuity in the image. At step 112, the control signals are shifted vertically at the jump locations, and at step 114 the shifted control signals are sent to the laser. Essentially, the control signals developed herein, coupled with the bow and tilt in the beam path, cancel each other out leaving an aligned, undistorted final image.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

In general, the foregoing description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled.

It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed is:

1. A method of printing using a laser printer comprising:
   determining bow and tilt in a beam path of a laser;
   processing image data representative of an image;
   developing a laser control signal representative of the image; and
   altering the control signal to shift pixels to compensate for the bow and tilt in the beam path;
   in which, when a location at which said laser moves from one horizontal scan-line to another occurs within a half-tone region, a half-tone pattern within the half-tone region is shifted at said location in a direction opposite a direction at which pixels are shifted by said altering of said control signal.

2. The method of claim 1 wherein determining bow and tilt in a beam path of a laser is performed during fabrication of a laser printer.

3. The method of claim 1 wherein determining bow and tilt in a beam path of a laser is performed using one or more sensors attached to the laser printer.

4. The method of claim 1 wherein processing the image data comprises edge detection.

5. The method of claim 1 wherein altering the control signal in response to bow and tilt in the beam path includes splicing.

6. The method of claim 5 wherein splicing is performed at points where the control signal is altered in response to the distortion present in the beam path.

7. The method of claim 5 wherein splicing is done only along edges.

8. The method of claim 5 wherein splicing is disabled in half-tone regions.

9. The method of claim 1 wherein the control signal is a pulse width modulated signal.

10. A method of printing using a laser printer comprising:
    determining bow and tilt in a beam path of a laser;
    processing image data representative of an image;
    developing a laser control signal representative of the image; and
    altering the control signal to shift pixels to compensate for the bow and tilt in the beam path; in which altering of the control signal is disabled in half-tone regions.

11. The method of claim 10 further comprising:
    analyzing the bow and tilt in the beam path to determine the horizontal locations at which the laser moves from one horizontal scan-line to another horizontal scan-line along the beam path.

12. The method of claim 11 wherein altering the control signal to compensate for the bow and tilt in the beam path includes shifting pixels at the locations at which the laser moves from one horizontal scan-line to another horizontal scan-line.

13. A laser printer comprising:
    at least one laser assembly in optical communication with a drum assembly, the at least one laser assembly configured to emit a laser beam onto the at least one drum assembly; and
    a processor configured for processing image data that is used to control said laser assembly to print a corresponding image;
    wherein the laser beam is generated under control of the processor in response to a plurality of control signals produced by the processor that are configured to compensate for laser beam bow and tilt;
    the processor further comprising an edge detector for detecting edges in said image using said image data,
    in which, upon detecting a location at which said laser beam shifts from one horizontal scan-line to another on said drum assembly due to said bow or tilt and said location corresponds to an edge detected by said edge detector, said processor is configured to define a splice area around said location and causes a line of pixels within said splice area to fade gradually from dark to light.

14. The printer of claim 13, wherein the control signals are pulse width modulated signals.

15. The printer of claim 13, wherein the laser beam is analyzed to determine horizontal locations at which the laser moves from one horizontal scan-line to another along the beam path.

16. The printer of claim 13, further comprising memory in which is stored horizontal locations at which the laser moves from one horizontal scan-line to another along the beam path during fabrication of the printer.

17. The printer of claim 13, further comprising one or more sensors adapted to analyze the laser beam, to determine horizontal locations at which the laser moved from one horizontal scan-line to another along the beam path.

18. The printer of claim 13, wherein the plurality of control signals are representative of horizontal scan lines of an image to be printed.

19. The printer of claim 18, wherein the image processing techniques include half-tone pattern shifting.

20. The printer of claim 13, wherein control signals are further configured in response to image processing techniques.

21. The printer of claim 13, wherein splicing is performed only at edges.

22. The printer of claim 21, wherein said splicing is performed only at visible edges, where a pixel value for an edge pixel corresponding to said visible edge differs from a value of an adjacent pixel above or below the edge pixel by a threshold amount.

23. The printer of claim 13, wherein compensation for laser beam bow and tilt is disabled in half-tone areas.

* * * * *

UNITED STATES PATENT AND TRADEMARK OFFICE
CERTIFICATE OF CORRECTION

| | | |
|---|---|---|
| PATENT NO. | : 7,688,341 B2 | Page 1 of 1 |
| APPLICATION NO. | : 11/759064 | |
| DATED | : March 30, 2010 | |
| INVENTOR(S) | : Richard L. Hilton, Jeffrey L. Trask and Kurt Robert Bengtson | |

It is certified that error appears in the above-identified patent and that said Letters Patent is hereby corrected as shown below:

Title Page: Item 12 and Item 75 of the patent reads Hilton, whereas they should read, Hilton, et al.

Item 75 shows Inventors: Hilton; Richard L. (Boise, ID), whereas it should read, Hilton; Richard L. (Boise, ID), Trask; Jeffrey L. (Boise, ID), Bengtson; Kurt Robert (Boise, ID)

Signed and Sealed this
Eleventh Day of September, 2012

David J. Kappos
*Director of the United States Patent and Trademark Office*